US010994704B2

(12) United States Patent
Morris et al.

(10) Patent No.: US 10,994,704 B2
(45) Date of Patent: May 4, 2021

(54) TRANSPORT VEHICLE SPRAY APPARATUS

(71) Applicants: William Morris, Laura, OH (US); John Baker, Ludlow Falls, OH (US); Wendell Austin, Bradford, OH (US)

(72) Inventors: William Morris, Laura, OH (US); John Baker, Ludlow Falls, OH (US); Wendell Austin, Bradford, OH (US)

(*) Notice: Subject to any disclaimer, the term of this patent is extended or adjusted under 35 U.S.C. 154(b) by 0 days.

(21) Appl. No.: 16/401,395

(22) Filed: May 2, 2019

(65) Prior Publication Data
US 2019/0337492 A1    Nov. 7, 2019

Related U.S. Application Data

(60) Provisional application No. 62/665,783, filed on May 2, 2018.

(51) Int. Cl.
| | |
|---|---|
| *B60S 1/64* | (2006.01) |
| *B60P 3/30* | (2006.01) |
| *B60P 3/22* | (2006.01) |
| *B05B 9/04* | (2006.01) |
| *B60S 1/66* | (2006.01) |

(52) U.S. Cl.
CPC .............. *B60S 1/64* (2013.01); *B05B 9/0423* (2013.01); *B60P 3/2205* (2013.01); *B60P 3/30* (2013.01); *B60S 1/66* (2013.01)

(58) Field of Classification Search
CPC ...... B60S 3/04; B60S 1/64; B60S 1/66; B60P 3/2205; B60P 3/30; B05B 1/20; B05B 15/60; B05B 15/62; B05B 9/0423

USPC .......................................... 239/159, 163, 170
See application file for complete search history.

(56) References Cited

U.S. PATENT DOCUMENTS

| | | | |
|---|---|---|---|
| 5,911,363 A | 6/1999 | Oligschlaeger | |
| 6,132,509 A | 10/2000 | Kuschnereit | |
| 6,589,595 B2 | 7/2003 | Kinnaird | |
| 6,863,223 B2 | 3/2005 | Rosa et al. | |
| 7,478,765 B2 * | 1/2009 | Knight | A01M 7/0089 239/119 |
| 2013/0017336 A1 | 1/2013 | Bandura | |
| 2020/0093118 A1 * | 3/2020 | Clarke | A01M 7/0082 |

* cited by examiner

*Primary Examiner* — Christopher S Kim
(74) *Attorney, Agent, or Firm* — Boudwin Intellectual Property; Daniel Boudwin

(57) ABSTRACT

A transport vehicle spray apparatus. The transport vehicle spray apparatus has at least one storage tank. A pump transports material from the storage tank through at least one filter and a manifold to at least one spray bar. The spray bar incorporates spray nozzles through which the material from the storage tank is dispensed. In one embodiment, the spray bar is connected to a collapsible frame on the top and back of the transport vehicle storage space. The collapsible frame can expand and collapse by sliding along the length of the walls of the transport vehicle storage space. As the frame expands and collapses, the spray bar coats the interior surfaces of the transport vehicle storage space with the material from the storage tank. The transport vehicle spray apparatus is utilized to spray and coat the walls of a transport vehicle's storage space with a desired fluid.

13 Claims, 6 Drawing Sheets

TRANSPORT VEHICLE SPRAY APPARATUS

CROSS REFERENCE TO RELATED APPLICATIONS

This application claims the benefit of U.S. Provisional Application No. 62/665,783 filed on May 2, 2018. The above identified patent application is herein incorporated by reference in its entirety to provide continuity of disclosure.

BACKGROUND OF THE INVENTION

The present invention relates to a transport vehicle spray apparatus. More particularly, the present invention provides for a transport vehicle spray apparatus including at least one storage tank and at least one spray bar that is integrated with the transport vehicle, wherein the at least one spray bar is configured to spray into the transport vehicle's storage space with a material stored in the at least one storage tank.

Transport vehicles often carry loads in their storage spaces or beds. These loads tend to leave behind an accumulation of dirt and residual matter. In some cases, the material being transported, such as asphalt, is transported "hot". Such materials are extremely viscous and if allowed to cool, may harden and adhere to the walls and bed of the transport vehicle. In such a situation it can be exceedingly difficult to remove such residual material. Transport vehicle drivers combat accumulations of such material by pre-treating the surfaces of their transport vehicle's storage space with a variety of release agent formulas. These formulas, as well as other cleaning agents, aid in cleaning the transport vehicle by creating a protective layer on the surface of the walls and bed of the storage space that the material has a harder time adhering to.

However, application of these formulas to the transport vehicle's storage space can be cumbersome, and in many instances dangerous. Individuals who attempt to clean their own transport vehicle's storage space risk exposure to the noxious chemicals in the release agent formulas. Additionally, such individuals must climb up the sidewalls of the transport vehicle's storage space, or into the storage space itself, exposing the individual to the risk of falling. Often these formulas leave a slick coating on the sidewalls and bed, which can be a slipping hazard to the individual applying the formula.

Many individuals do not want to risk such danger and therefore take their transport vehicles to a professional cleaning site, or soap rack. These sites are often quite busy, and the individual may have to wait an inordinate amount of time in order to remove the residual matter on their transport vehicle's storage space. Additionally, these sites may require that cleaning professionals be utilized, adding to the total cost. Time spent waiting may also be increased as the number of cleaning professionals can be limited. Because transport vehicles are typically cleaned and pre-treated prior to every load, utilizing these professional cleaning sites quickly becomes prohibitively expensive and time-consuming.

Devices have been disclosed in the known art that relate to spray apparatus devices. These include devices that have been patented and disclosed in patent application publications. However, the devices in the known art have several drawbacks. Some of these devices are hand-held, requiring the individual to climb in and around the transport vehicle's storage space themselves, thereby exposing the individual to potential slip and fall accidents. Some devices are external structures that are not integrated with the transport vehicle, leading to long lines and waits to use the structure. Some devices are only configured to spray an area outside of a vehicle and cannot spray into the transport vehicle's storage space.

The present invention substantially diverges in design elements from the known art and consequently it is clear that there is a need in the art for an improvement to existing spray apparatus devices. The present invention substantially fulfills these needs.

SUMMARY OF THE INVENTION

In view of the foregoing disadvantages inherent in the known types of transport vehicle spray apparatus devices now present in the prior art, the present invention provides a transport vehicle spray apparatus wherein the same can be utilized for providing convenience to the user when spraying various materials, including release agent formulas, into the storage space of the transport vehicle. The present transport vehicle spray apparatus comprises at least one storage tank. A pump transports material from the storage tank through at least one filter and a manifold to at least one spray bar. The spray bar incorporates spray nozzles through which the material from the storage tank is dispensed. In one embodiment, the spray bar is connected to a collapsible frame on the top and back of the transport vehicle storage space. The collapsible frame can expand and collapse by sliding along the length of the walls of the transport vehicle storage space. As the frame expands and collapses, the spray bar coats the interior surfaces of the transport vehicle storage space with the material from the storage tank. The transport vehicle spray apparatus is utilized to spray and coat the walls of a transport vehicle's storage space with a desired fluid.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 shows a perspective view of a storage tank in an embodiment of the transport vehicle spray apparatus.

FIG. 2 shows a perspective view of the pump and filter assemblies in an embodiment of the transport vehicle spray apparatus.

FIG. 3 shows a perspective view of the collapsible frame in an embodiment of the transport vehicle spray apparatus.

FIG. 4 shows a perspective view of the frame and spray bar in an embodiment of the transport vehicle spray apparatus in use.

FIG. 5 shows a perspective view of the spray bar and nozzles disposed on the back and sidewalls of a truck bed in an embodiment of the transport vehicle spray apparatus in use.

FIG. 6 shows a block diagram of the components of an embodiment of the transport vehicle spray apparatus.

DETAILED DESCRIPTION OF THE INVENTION

Reference is made herein to the attached drawings. Like reference numerals are used throughout the drawings to depict like or similar elements of the transport vehicle spray apparatus. For the purposes of presenting a brief and clear description of the present invention, a preferred embodiment will be discussed as used for automatically treating the storage area of a transport vehicles with release agents or other fluids. The figures are intended for representative purposes only and should not be considered to be limiting in any respect.

Figure 1:
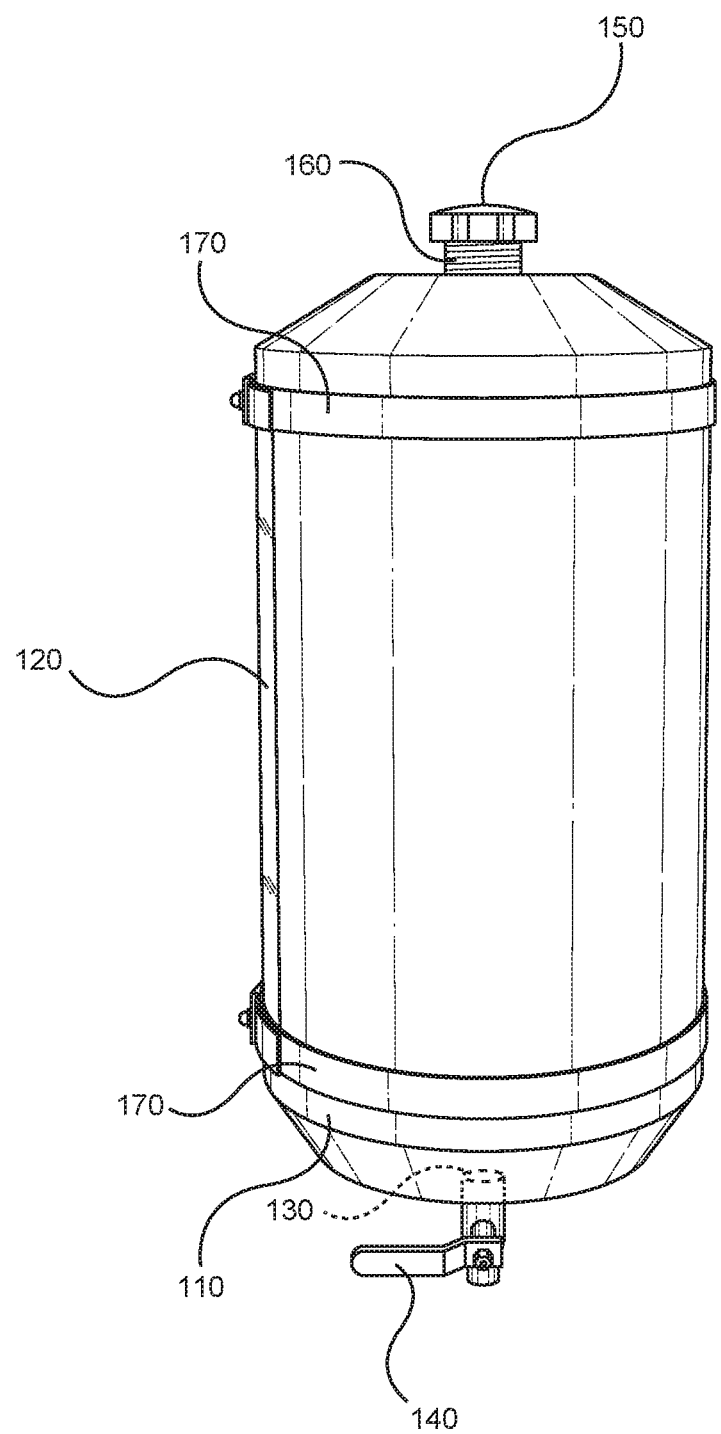

Referring now to FIG. 1, there is shown a perspective view of a storage tank in an embodiment of the transport vehicle spray apparatus. The storage tank 110 can include a variety of shapes and sizes. Multiple storage tanks 110 can also be included in the transport vehicle spray apparatus such that a sufficient supply of fluid material is available to be disbursed from the storage tank 110 in order to cover the storage space of the transport vehicle. In the shown embodiment, the storage tank 110 is an aluminum 8-gallon container. One of ordinary skill in the art will understand that the storage tank 110 can be constructed of various materials suitable for storage a variety of liquid materials, including but not limited to steel, aluminum and plastic.

In the shown embodiment, a sight glass 120 is integrated along a vertical length of the storage tank 110. In one embodiment, the sight glass 120 is a cylinder that is disposed along the entire vertical length of the storage tank 110. The sight glass 120 is composed at least partially of a transparent material such that the level of material remaining in the storage tank 110 can be determined by observing the level at which the material is visible in the sight glass 120. In this manner, the individual can ascertain if the material in the storage tank 110 is running low and needs to be refilled. In alternate embodiments, the sight glass 120 may be replaced by or supplemented by any type of level sensor through which an individual can observe the level of material contained within the storage tank 110, such as a visible floating indicator or a digital liquid level sensor connected to an external display, for example.

In the shown embodiment, a drain valve 130 is disposed on the bottom of the storage tank 110. In this embodiment, the drain valve 130 is able to be selectively opened or closed via a drain valve handle 140 such that when the drain valve 130 is open, material in the storage tank 110 can flow through the drain valve 130 and out of the storage tank 110. In such manner, an individual can empty the storage tank 110 and remove the materials therein. Such drainage of the storage tank 110 can be advantageous when removing materials that would freeze in cold weather, or to prepare the storage tank 110 for receiving a new material.

In the shown embodiment, a sealable cap 150 is disposed on the top of the storage tank 110. In this embodiment, the sealable cap 150 is selectively removable and is secured to the storage tank 110 via engagement between a threaded collar 160 and a reciprocal thread in the sealable cap 150. An individual can fill the storage tank 110 by removing the sealable cap 150 and filling the storage tank 110 through an opening defined by the open center area of the annular threaded collar 160. The threaded collar 160 provides the benefit of allowing an individual to fasten a reciprocally threaded hose or other container to the threaded collar 160, thereby providing a secure and continuous pathway for the material to flow into the storage tank 110.

In the shown embodiment, a pair of straps 170 are configured to securely mount the storage tank 110 to the transport vehicle. The straps 170 are adjustable in order to provide a tight and secure connection between the storage tank 110 and the transport vehicle. In one embodiment, the straps encircle an existing support structure of a chassis of the transport vehicle. In another embodiment, the straps are secured to the chassis of the transport vehicle via screws, bolts, or other similar attachments. In this manner, the storage tank 110 is fully portable and integrated with the transport vehicle such that the tank will not fall over when the transport vehicle is in motion. It should be understood by one of ordinary skill in the art that any manner of securing the storage tank 110 to a transport vehicle will be included as part of this disclosure.

Figure 2:
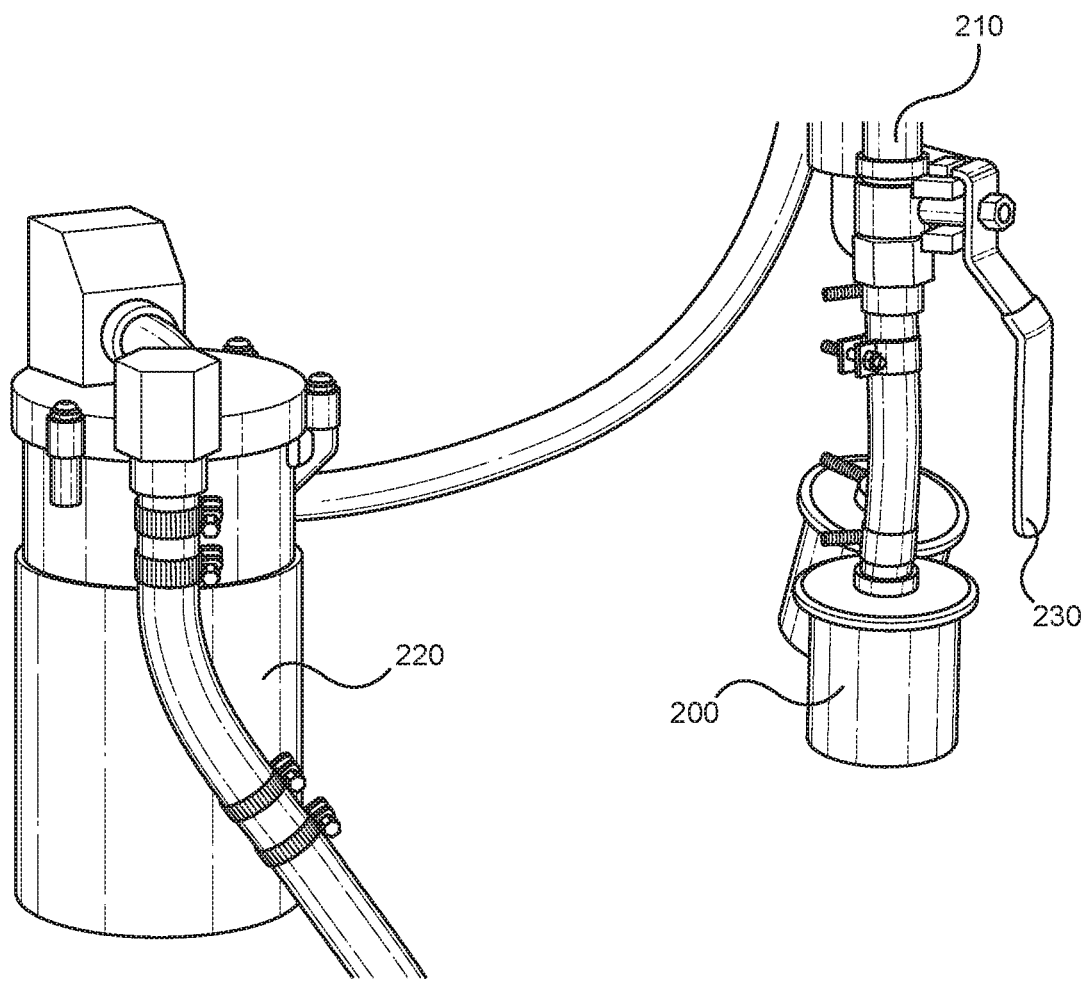

Referring now to FIG. 2, there is shown a perspective view of the pump and filter assemblies in an embodiment of the transport vehicle spray apparatus. The storage tank is in fluid communication with at least one filter assembly 200. In such a manner an individual can separate undesirable materials from the storage tank 110 by passing the material through the at least one filter assembly 200 which selectively strains the material as it passes through the filters. The at least one filter assembly 200 is in fluid communication with a manifold 210. The manifold 210, in turn, is in fluid communication with a pump 220. The pump 220 is electrically connected to a switch which is configured to selectively activate and deactivate the pump 220 upon actuation. In one embodiment, the switch is disposed on a dashboard of the transport vehicle. The pump 220 is electrically connected to a power source. In one embodiment, the power source is a battery. In another embodiment, the power source is the electrical system of the transport vehicle.

Upon activation, the pump 220 is configured to transport material from the storage tank through the filter assembly 200 into the manifold 210. A manifold lever 230 is operably connected to the manifold 210 such that an individual may select which storage tank and filter assembly 220 the material transported via the pump 220 will flow through. In this manner, the individual can select from various different storage tanks 110 and filter assemblies 220.

Figure 3:
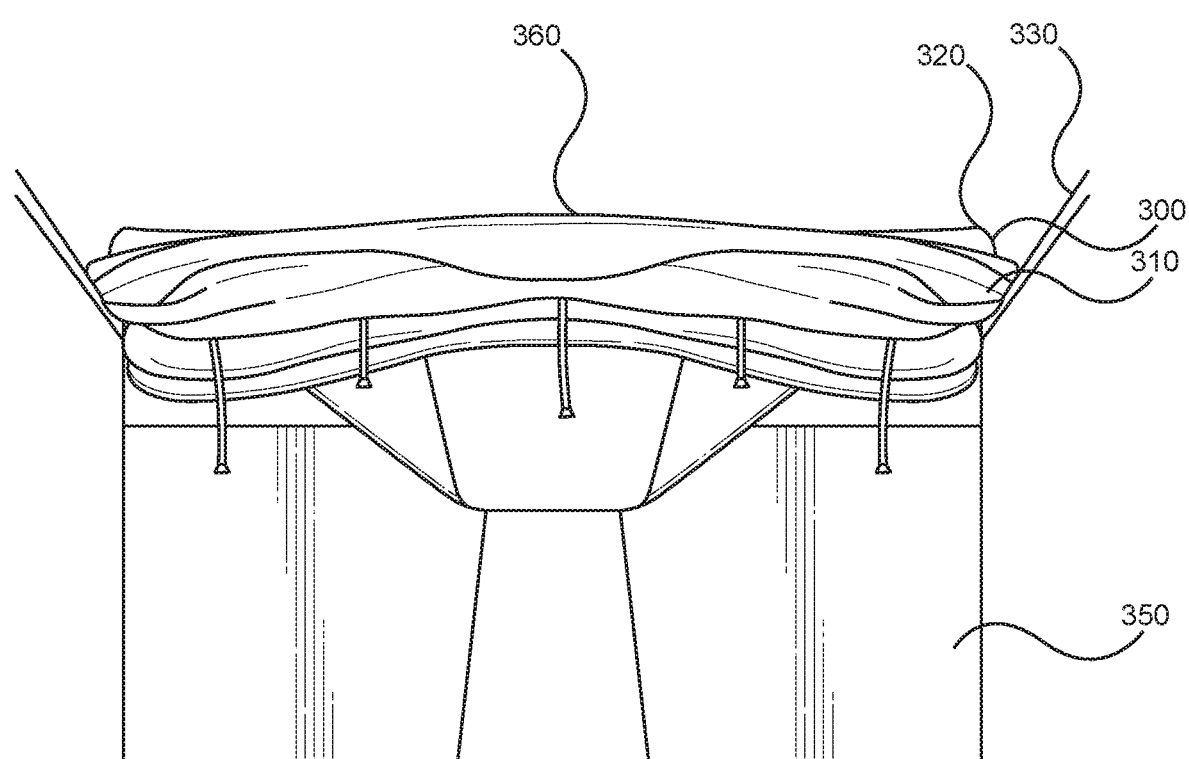

Referring now to FIG. 3, there is shown a perspective view of the collapsible frame in an embodiment of the transport vehicle spray apparatus. The collapsible frame 300 includes a first end 310 and a second end 320. The first end 310 of the collapsible frame 300 is disposed on the top and back of the transport vehicle bed. The collapsible frame 300 can expand and collapse by sliding along the length of the walls 330 of the transport vehicle bed 350. In the shown embodiment, a flexible tarp 360 is secured to the top of the collapsible frame 300.

Figure 4:
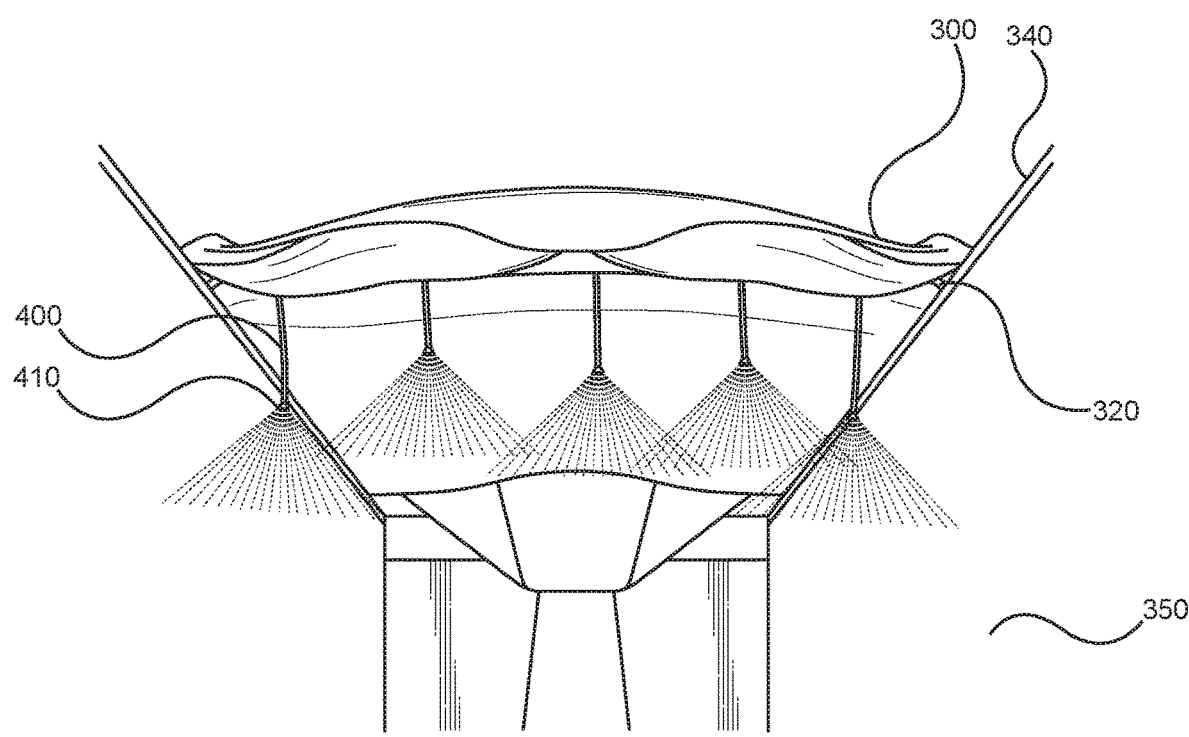

Referring now to FIG. 4, there is shown a perspective view of the frame and spray bar in an embodiment of the transport vehicle spray apparatus, in use. At least one spray bar 400 is in fluid communication with the pump. In the shown embodiment, the at least one spray bar 400 is disposed on the second end 320 of the collapsible frame 300. The at least one spray bar 400 comprises a plurality of spray nozzles 410 configured to pass liquid material therethrough. The plurality of spray nozzles 410 are disposed on the end of the at least one spray bar 400 such that when the pump is activated, the material from the storage tank is dispersed through the plurality of spray nozzles 410 onto the side walls 330 and bed 350 of the transport vehicle's storage space. As the collapsible frame 300 expands and collapses, the at least one spray bar 400 coats the interior surfaces of the transport vehicle's storage space with the material from the storage tank. The at least one spray bar 400 and plurality of spray nozzles 410 are disposed in a manner providing maximum coverage of the transport vehicle's storage space surfaces.

Figure 5:
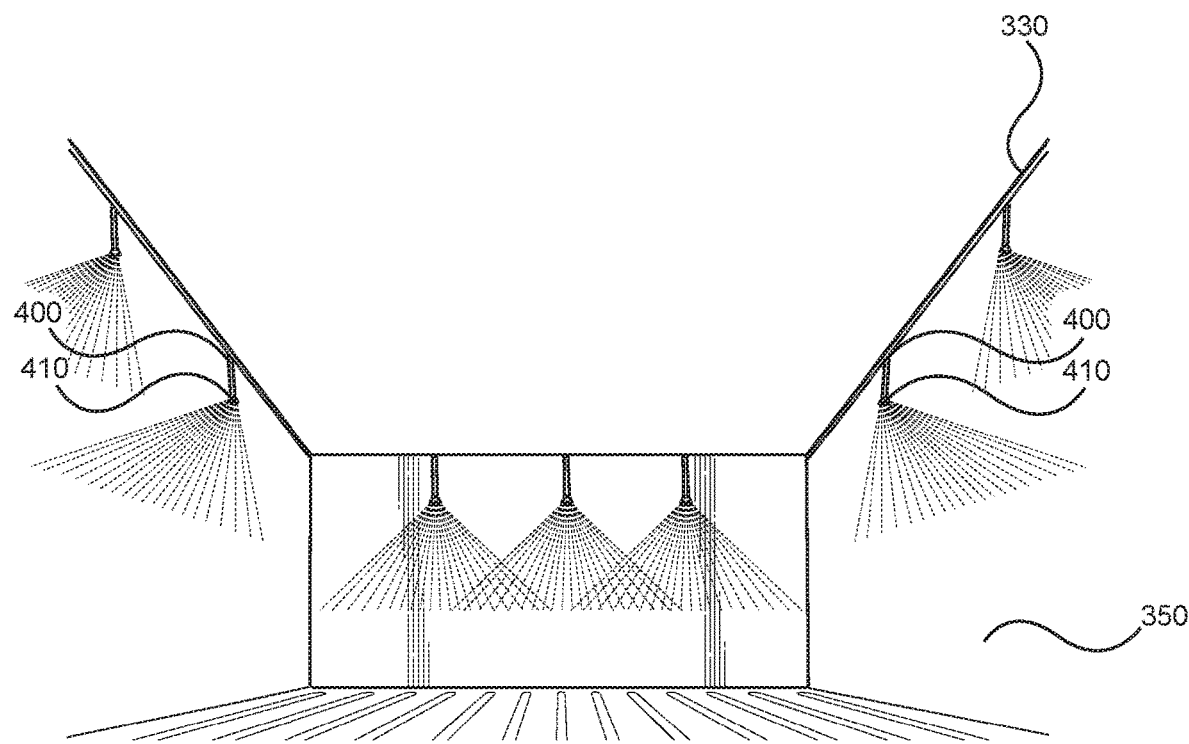

Referring now to FIG. 5, there is shown a perspective view of the spray bar and nozzles disposed on the back and sidewalls of a truck bed in an embodiment of the transport vehicle spray apparatus, in use. In the shown embodiment, the at least one spray bar 400 is disposed along the top of the side walls 330, and the top of the back of a truck bed. The plurality of spray nozzles 410 are adjustable and can be positioned to provide maximum coverage of the transport vehicle's storage space 350; in this case the truck bed. In another embodiment, the plurality of spray nozzles 410 further comprise a screen. The screen is configured to prevent the plurality of spray nozzles 410 from dripping upon deactivation of the transport vehicle spray apparatus. In another embodiment, the plurality of spray nozzles 410 further comprises a check valve. The check valve is configured to keep the spray bar 400 and spray nozzles 410 primed with material from the storage tank. In such a manner, upon activation of the transport vehicle spray apparatus, the material can be distributed with little to no lag time.

Figure 6:
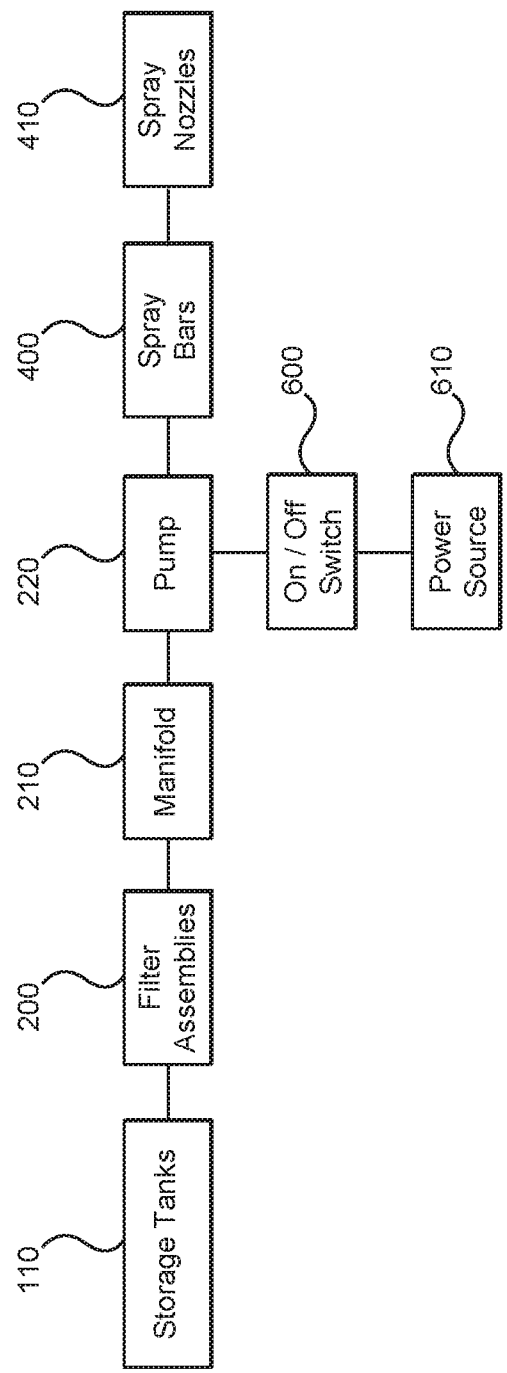

Referring now to FIG. 6, there is shown a block diagram of the function of the transport vehicle spray apparatus. The at least one storage tank 110, which stores a desired material, is in fluid communication with the at least one filter assembly 200. The at least one filter assembly 200, in turn, is in fluid communication with a manifold 210. The manifold 210 is in fluid communication with a pump 220 and the pump 220 is in electrical communication with an on/off switch 600. The on/off switch 600 is in electrical communication with a power source 610. Upon activation of the transport vehicle spray apparatus by the switch 600, the pump 220 transports material stored in the storage tanks 110 through the at least one filter assembly 200 into the manifold 210.

The manifold 210 is in fluid communication with at least one spray bar 400. In one embodiment the spray bars 400 are in turn fluidly connected to at least one spray nozzle 410. The spray bars 400 are configured such that the materials from the storage tanks 110 are dispersed through the spray bars 400 and spray nozzles 410 in a manner providing maximum coverage of the transport vehicle's storage space. In such a manner, an individual can activate the transport vehicle spray apparatus which sprays the interior of the transport vehicle's storage space with a material, such as release agent formula, thereby enabling the transport vehicle's storage space to be cleaned and/or pre-treated for the next load the transport vehicle will carry.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A transport vehicle spray apparatus, comprising:
   at least one storage tank configured to store a material;
   at least one filter assembly in fluid communication with the at least one storage tank;
   a pump in fluid communication with the at least one filter assembly;
   the pump electrically connected to a switch;
       wherein the switch is configured to selectively activate and deactivate the pump;
   the switch electrically connected to a power source;
   the pump configured to pump the material stored in the at least one storage tank;
   at least one spray bar in fluid communication with the pump;
       wherein the spray bar comprises a plurality of spray nozzles where through the material is dispensed from the at least one storage tank via the pump;
   wherein the at least one spray bar is disposed on a collapsible frame having a first end and a second end;
   the collapsible frame configured to slidably expand and collapse along a length of a transport vehicle storage space;
   the at least one spray bar mounted on the second end of the collapsible frame.

2. The transport vehicle spray apparatus of claim 1, wherein the spray nozzles are disposed on a sidewall of an enclosed structure.

3. The transport vehicle spray apparatus of claim 1, further comprising a sight-glass disposed along the vertical length of the storage tank.

4. The transport vehicle spray apparatus of claim 1, further comprising a drain valve disposed on the bottom of the storage tank.

5. The transport vehicle spray apparatus of claim 1, further comprising a manifold, wherein the manifold is operably connected to the at least one filter.

6. The transport vehicle spray apparatus of claim 1, further comprising a manifold, wherein the manifold is operably connected to the at least one storage tank.

7. The transport vehicle spray apparatus of claim 1, wherein the power source is a battery.

8. The transport vehicle spray apparatus of claim 1, wherein the power source is the electrical system of the transport vehicle.

9. The transport vehicle spray apparatus of claim 1, wherein the at least one spray bar is fluidly connected to at least one spray nozzle.

10. The transport vehicle spray apparatus of claim 1, wherein the first end of the collapsible frame is disposed on a top rear portion of the transport vehicle storage space.

11. The transport vehicle spray apparatus of claim 1, wherein the storage tank further comprises a pair of straps.

12. The transport vehicle spray apparatus of claim 1, wherein the storage tank is cylindrical.

13. The transport vehicle spray apparatus of claim 1, wherein the storage tank comprises a sealable cap disposed on top of the storage tank, the sealable cap engaged via a threaded collar.

* * * * *